(12) United States Patent
Margines et al.

(10) Patent No.: US 11,615,355 B2
(45) Date of Patent: Mar. 28, 2023

(54) SERVICE AREA MAPS FOR AUTONOMOUS VEHICLES

(71) Applicant: Waymo LLC, Mountain View, CA (US)

(72) Inventors: David Margines, Sunnyvale, CA (US); Tacettin Guney, San Jose, CA (US); Saksiri Tanphaichitr, Palo Alto, CA (US); Jeffrey Min, Mountain View, CA (US); Laurens Feenstra, San Francisco, CA (US); Peter Pawlowski, Menlo Park, CA (US); Dirk Haehnel, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 231 days.

(21) Appl. No.: 16/697,618

(22) Filed: Nov. 27, 2019

(65) Prior Publication Data
US 2020/0410419 A1 Dec. 31, 2020

Related U.S. Application Data

(60) Provisional application No. 62/866,670, filed on Jun. 26, 2019.

(51) Int. Cl.
G06Q 10/06 (2012.01)
G06Q 10/08 (2012.01)
G06Q 10/0631 (2023.01)
G06Q 10/02 (2012.01)
H04W 4/40 (2018.01)
G08G 1/00 (2006.01)
H04W 4/021 (2018.01)
G06Q 50/30 (2012.01)

(52) U.S. Cl.
CPC ....... G06Q 10/06312 (2013.01); G06Q 10/02 (2013.01); G06Q 10/06315 (2013.01); G06Q 50/30 (2013.01); G08G 1/202 (2013.01); H04W 4/021 (2013.01); H04W 4/40 (2018.02)

(58) Field of Classification Search
CPC .............................. G06Q 10/06; G06Q 10/08
USPC ....................................................... 705/7.22
See application file for complete search history.

(56) References Cited

U.S. PATENT DOCUMENTS

2016/0334797 A1* 11/2016 Ross ....................... G06Q 10/08
2017/0123421 A1* 5/2017 Kentley ................. G06Q 10/00
2017/0132934 A1* 5/2017 Kentley ................. G08G 1/202
2018/0061242 A1* 3/2018 Bavar ................ G01C 21/3407
(Continued)

Primary Examiner — Nga B Nguyen
(74) Attorney, Agent, or Firm — Botos Churchill IP Law

(57) ABSTRACT

Aspects of the technology relate to providing service area maps for an autonomous vehicle transportation service having a fleet of vehicles. For instance, each vehicle of the fleet is associated with a polygon corresponding to a service area for that vehicle. A first location may be received from a client computing device, and a set of vehicles of the fleet of vehicles that are currently available to provide transportation services may be identified based on the first location. The polygons associated with each of the set of vehicles may be used to determine a first polygon having a geographic area. A first portion of map information corresponding to the geographic area of the first polygon may be identified, and the first portion may be provided to the client computing device for display to a user such that the portion represents a currently available service area for the user.

20 Claims, 17 Drawing Sheets

(56) References Cited

U.S. PATENT DOCUMENTS

| | | | |
|---|---|---|---|
| 2018/0202820 A1* | 7/2018 | Yu | G01C 21/3423 |
| 2018/0231389 A1 | 8/2018 | De Nunzio et al. | |
| 2018/0300660 A1* | 10/2018 | Coan | H04W 4/029 |
| 2018/0308191 A1* | 10/2018 | Matthiesen | G01C 21/3438 |
| 2018/0315146 A1* | 11/2018 | Matthiesen | G01C 21/3453 |
| 2018/0322775 A1 | 11/2018 | Chase et al. | |
| 2018/0329428 A1 | 11/2018 | Nagy et al. | |
| 2018/0342035 A1* | 11/2018 | Sweeney | G06Q 50/30 |
| 2018/0342157 A1* | 11/2018 | Donnelly | B60R 16/037 |
| 2018/0356821 A1 | 12/2018 | Kentley-Klay et al. | |
| 2020/0311846 A1* | 10/2020 | Chen | G06Q 50/30 |
| 2020/0378771 A1* | 12/2020 | Beaurepaire | G01C 21/20 |

\* cited by examiner

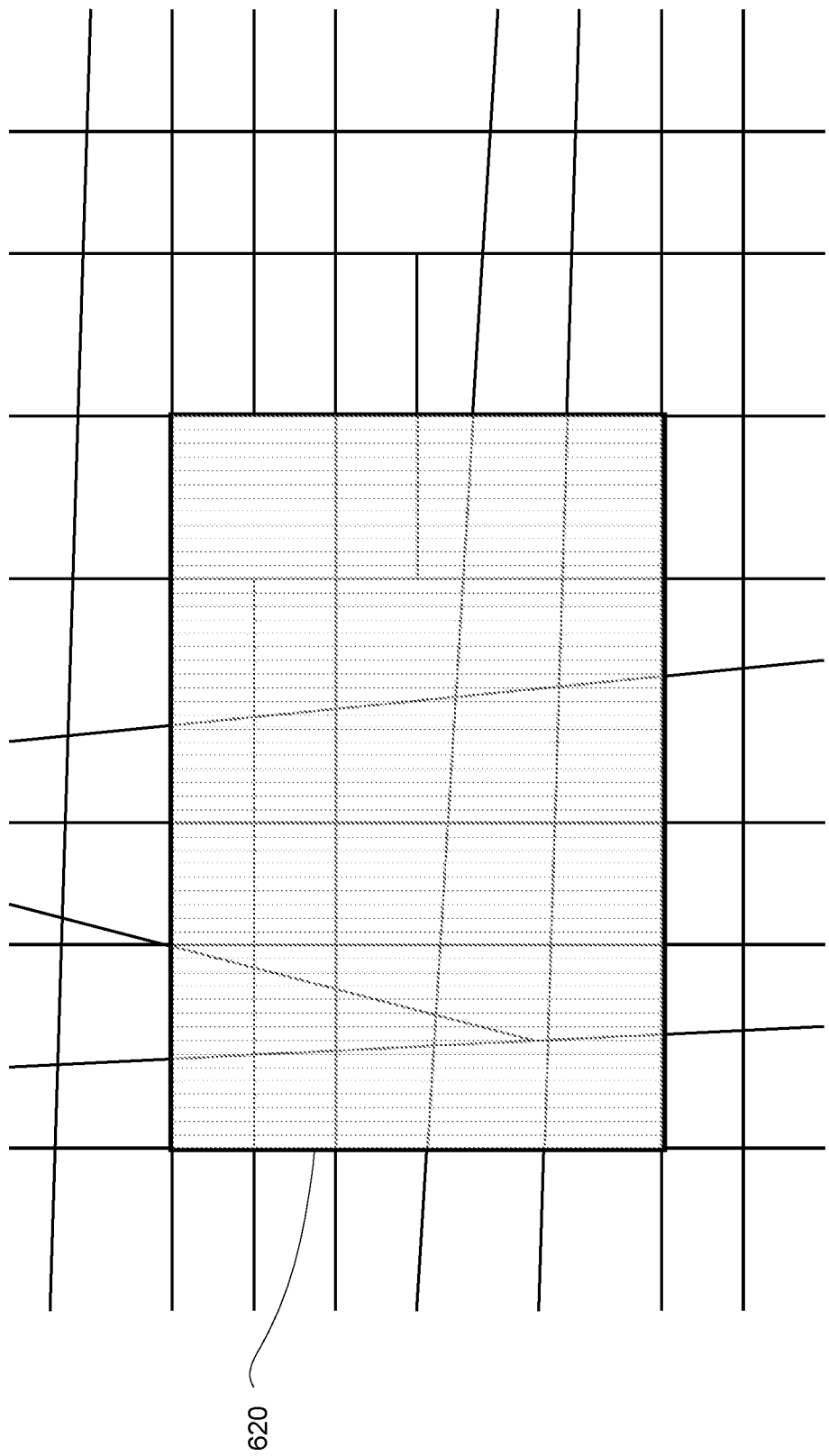

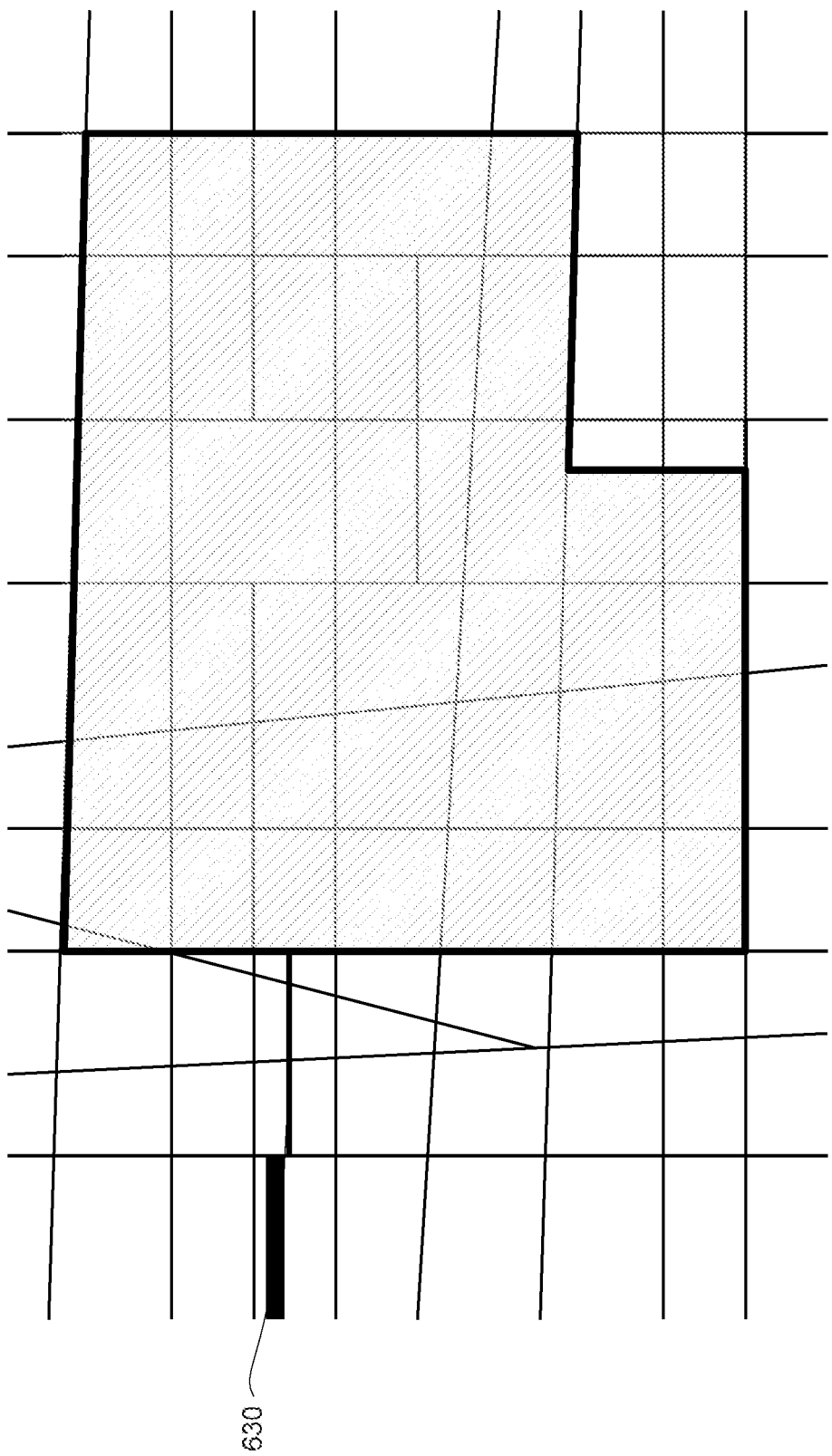

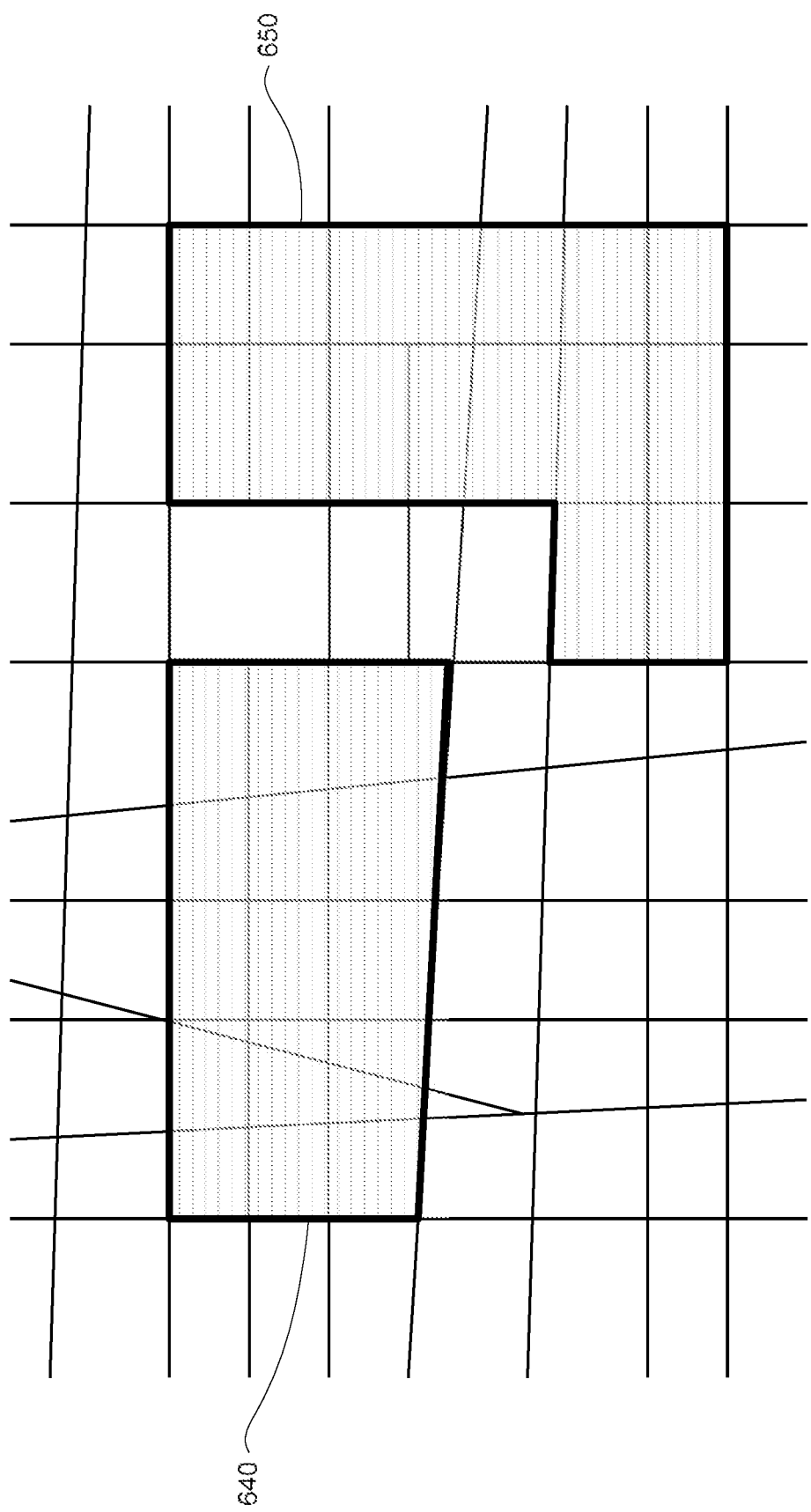

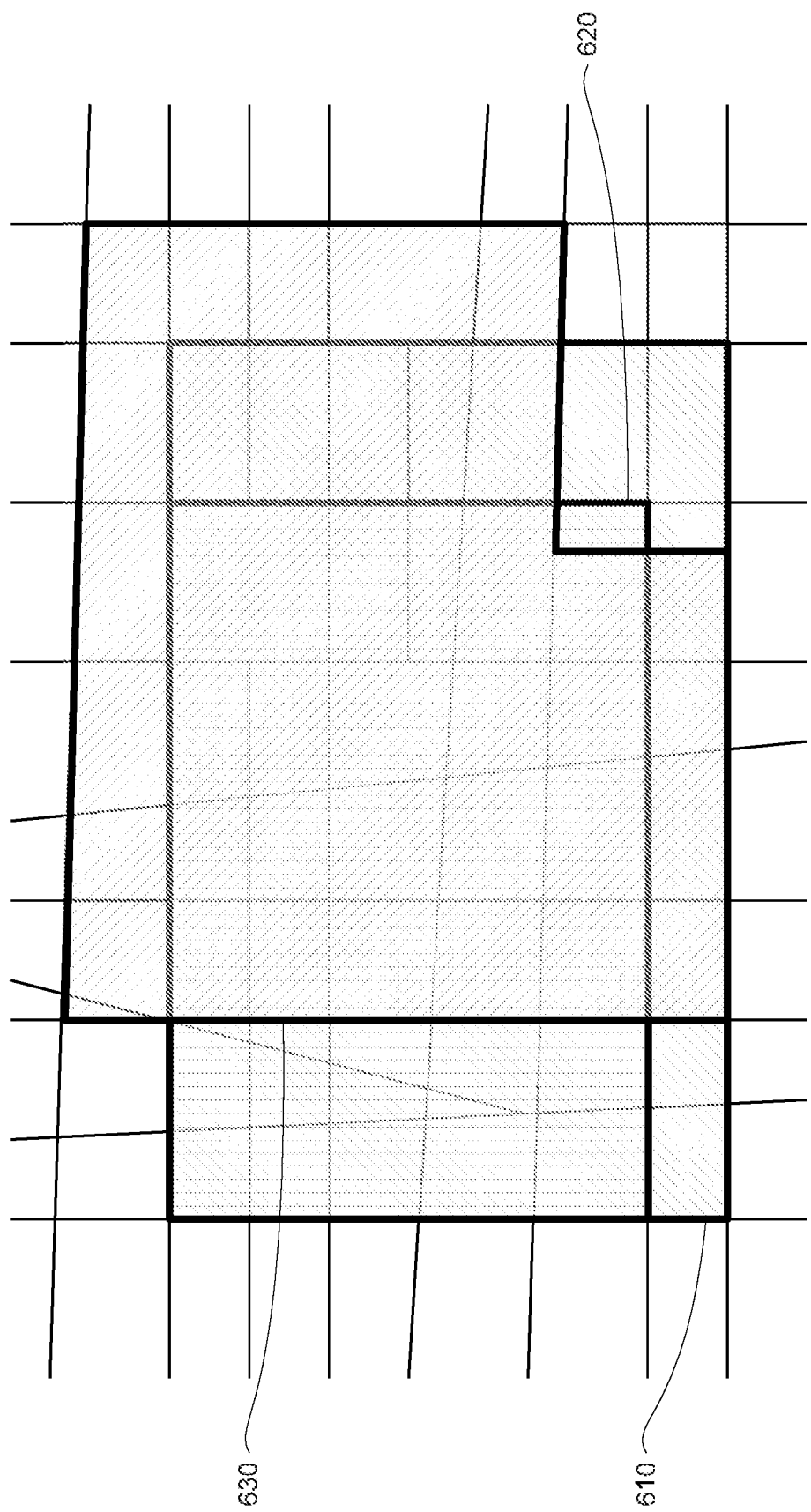

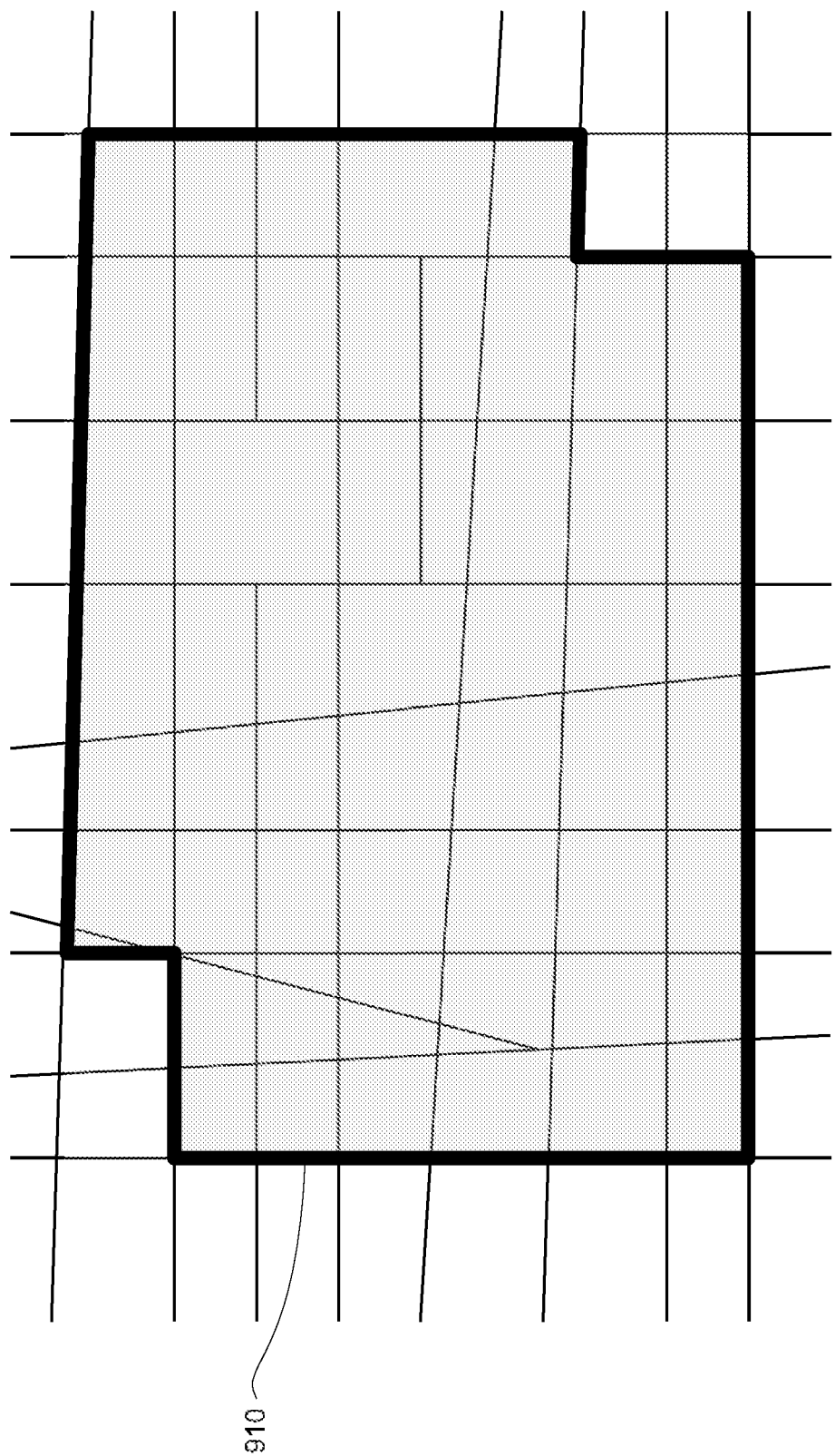

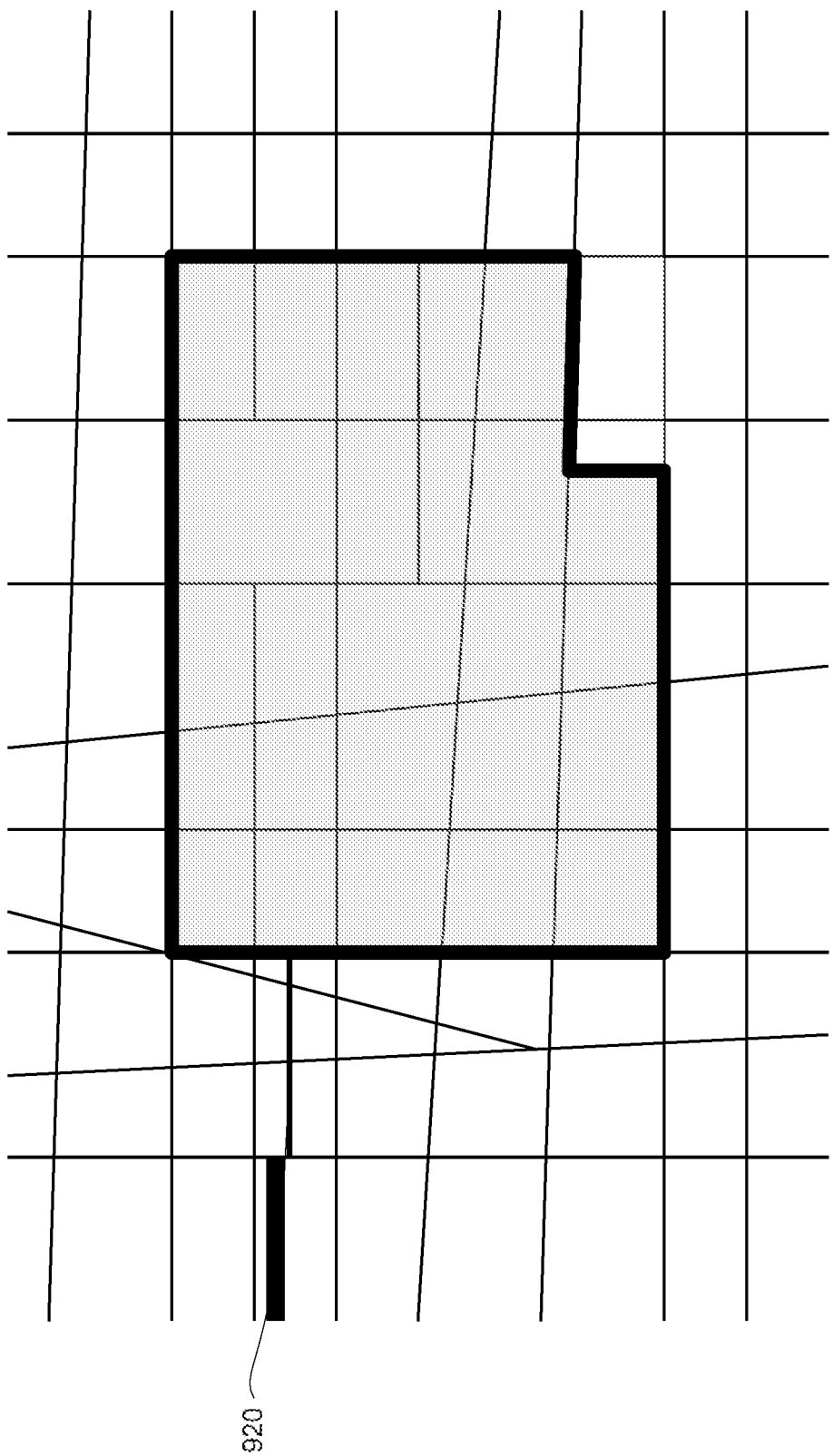

SERVICE AREA MAPS FOR AUTONOMOUS VEHICLES

CROSS REFERENCE TO RELATED APPLICATIONS

The present application claims the benefit of the filing date of U.S. Provisional Application No. 62/866,670, filed Jun. 26, 2019, the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or drop off location, and the vehicle maneuvers itself to that location. In some instances, a vehicle may be restricted to one or more service areas. A service area may define an area where a vehicle is able to drive and provide trip services for passengers and/or cargo. Different vehicles belonging to the same fleet of autonomous vehicles may have different capabilities, such as different perception systems or planning systems, or different functional purposes, such as trip services only or testing and trip services only. As such, or for other reasons, different vehicles in the same fleet may be associated with different service areas for servicing trips.

BRIEF SUMMARY

One aspect of the disclosure provides a method of providing service area maps for an autonomous vehicle transportation service having a fleet of vehicles. Each vehicle of the fleet is associated with a polygon corresponding to a service area for that vehicle. The method includes receiving, by one or more server computing devices, a first location from a client computing device; identifying, by the one or more server computing devices, a set of vehicles of the fleet of vehicles that are currently available to provide transportation services based on the first location; using, by the one or more server computing devices, the polygons associated with each of the set of vehicles to determine a first polygon having a geographic area; identifying, by the one or more server computing devices, a first portion of map information corresponding to the geographic area of the first polygon; and providing, by the one or more server computing devices, the first portion of the map information to the client computing device for display to a user such that the first portion of the map information represents a currently available service area for the user.

In one example, the first location is a pickup location for a trip to be taken by the user. In this example, the first location is a current location of the client computing device. In another example, the method also includes, receiving a notification that an application of the client computing device for the autonomous vehicle transportation service has been opened, and wherein the identifying the set of available vehicles is in response to the notification. In another example, identifying the set of vehicles includes identifying vehicles that are able to reach the first location in order to pick up the user. In another example, determining the first polygon includes determining a largest area covered by all of the polygons associated with each of the set of vehicles. In another example, determining the first polygon includes determining an overlapping area where all of the polygons associated with each of the set of vehicles overlap with one another. In another example, the method also includes reducing the first polygon using a polygon corresponding to a service area for the user, and the reduced first polygon is used to identify the portion of map information. In this example, the reduced first polygon corresponds to an area of intersection between the first polygon and the polygon corresponding to a service area for the user. In another example, each vehicle of the fleet is associated with a set of pick up and/or drop off locations, and the method also includes determining a first set of pick up and/or drop off locations based on the sets of pick up and/or drop off locations for the vehicles of the set of available vehicles and providing the first set of pick up and/or drop off locations to the client computing device. In this example, determining the first set of pick up and/or drop off locations is further based on the geographic area of the first polygon. In addition or alternatively, the method also includes, prior to providing the first set of pick up and/or drop off locations to the client computing device, filtering the first set of pick up and/or drop off locations based on any limitations on pick up and drop off locations for the user.

In another example, the method also includes receiving a notification from the client computing device confirming a trip including a pickup location and a drop off location; in response to receiving the notification, assigning a vehicle of the set of available vehicles to the trip; and determining a second portion of map information using the polygon of the assigned vehicle. In this example, determining the second portion of map information is further based on a polygon corresponding to a service area for the user. In addition, the method also includes determining an intersection between the polygon of the assigned vehicle and the polygon corresponding to a service area for the user, and wherein determining the second portion of map information is further based on the intersection. In another example, the method also includes sending the second portion of map information to the assigned vehicle for display to the user in order to prevent the user from attempting to go outside of the service area for the trip during the trip. In another example, the method also includes, sending the second portion of map information to the client computing device for display to the user in order to prevent the user from attempting to go outside of the service area for the trip during the trip. In another example, each vehicle of the fleet is associated with a set of drop off locations, and the method also includes determining a first set of drop off locations based on the set of drop off locations for the assigned vehicle and providing the first set of drop off locations to at least one of the assigned vehicle or the client computing device. In this example, the method also includes determining an intersection between the polygon of the assigned vehicle and a polygon corresponding to a service area for the user, and wherein determining the first set of drop off location is further based on the intersection. In addition, the method also includes, prior to providing the first set of drop off locations to at least one of the assigned vehicles or the client computing device, filtering the first set of drop off locations based on any limitations on drop off locations for the user.

BRIEF DESCRIPTION OF THE DRAWINGS

FIGS. 6A-6D are example geolocated polygons and map information in accordance with aspects of the disclosure.

FIGS. 9A-9C are example geolocated polygons and map information in accordance with aspects of the disclosure.

DETAILED DESCRIPTION

Overview

Figure 1:
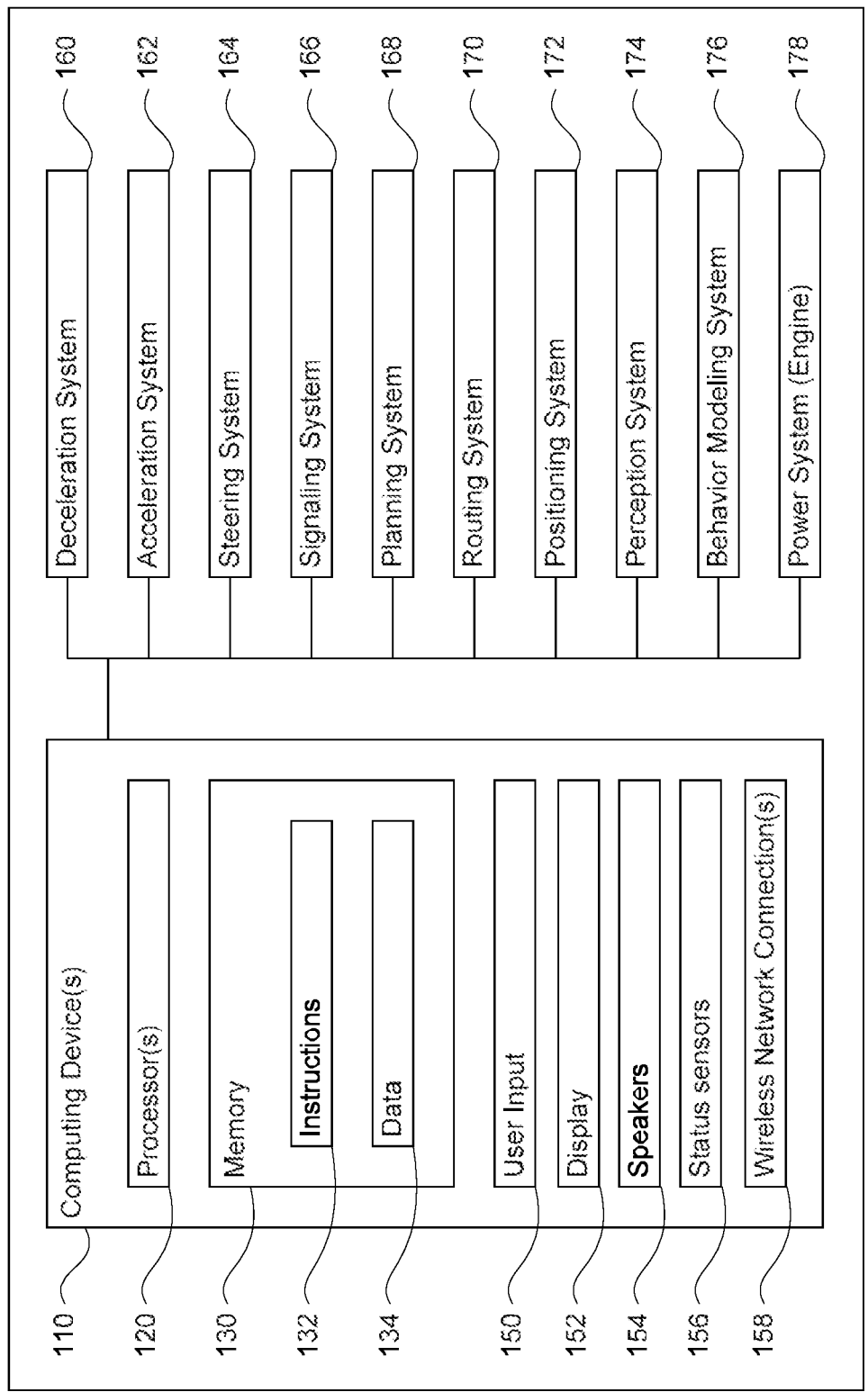
FIG. 1 is a functional diagram of an example vehicle in accordance with aspects of the disclosure.

The technology relates to generating service area maps for autonomous vehicle trip services in real time. For instance, a service area may define an area where a vehicle is able to drive and provide trip services for passengers and/or cargo. Because service areas may be different from vehicle to vehicle in a fleet of vehicles and may even be different for different users (passengers) or cargo (goods) of a service, different service areas may come into play at different points for a user of such services. For instance, when the user requests a vehicle, the available service area may be quite broad. But once the user is assigned a specific vehicle, the assigned vehicle's service area may be much smaller. As such, if the user wants to change his or her destination, but is shown the same broad service area, he or she may not be able to reach the same locations which may previously have been depicted as available in the broader service area. This may be somewhat confusing to the user. To address these issues, the service area maps for each trip may be determined at different points in time as discussed further below.

A dispatching system may include one or more server computing devices which are able to track and access information about vehicles of the fleet. In addition, the storage system may store information identifying a service area for each vehicle. Each service area may correspond to a geolocated polygon or multiple polygons that can be used to identify a section of map and the information in the map contained within.

The dispatching system may also have access to map information which may include various information including data for drawing an image-based map for display or presentation to a user. This data may include the shape and location of roads, areas where the vehicle cannot drive or is directed not to drive, points of interest, predetermined pick up and drop off locations, and any other details that may be useful for drawing a map for display.

To facilitate the vehicle services, users may access an application on a client computing device. The application may enable the user to request a trip and provide information such as pick up and drop off location information to the dispatch system. The application may send, and the dispatch system may receive, notifications when the user opens the application or when the user identifies a pickup and/or drop off location. Once the dispatch system receives the notification, the server computing devices may identify a set of available vehicles. The server computing devices may then identify a map area polygon based on the set of available vehicles. To do so, the server computing devices may identify the polygons for each vehicle of the set of available vehicles and use those polygons to determine the map area polygon. The map polygon may then be used to identify a first portion of the map information. The first portion of the map information may then be sent to the user's client computing device for display to the user.

Once the user actually requests a trip, for instance, by confirming the pickup and drop off locations, the application may send another notification to the server computing devices. In response, the server computing devices may assign a vehicle to the user for the trip. Once the server computing devices have assigned a vehicle, a second portion of the map information may be determined using the polygon of the assigned vehicle. For instance, the geographic area of the polygon of the assigned vehicle may be used to identify the second portion of the map information. This second portion of the map information may be sent to the assigned vehicle and/or the user's client computing device for display to the user. In this regard, when a user is on a trip, the user will be readily able to understand the service area that the assigned vehicle is capable of taking the user, and the user may be prevented from trying to go outside of the service area that the assigned vehicle is permitted to or can actually reach.

The features described herein may enable an autonomous vehicle service to provide trips using a fleet of vehicles which may have different service areas to users which themselves may have service area restrictions. In addition, the features described herein enable users to readily understand the available service areas (and in some instances, specific pick up and drop off locations) that are available at any given time. Moreover, when a user is on a trip, the user may be prevented from trying to go outside of the service area that the assigned vehicle is permitted to or can actually reach.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user inputs 150 (e.g., a mouse, keyboard, touch screen, buttons, and/or microphone) and various electronic displays (e.g., a monitor having a screen or any other electrical device that is operable to display information). In this example, the vehicle includes a display 152 as well as one or more speakers 154 to provide information or audio-visual experiences. In this regard, display 152 may be located within a cabin of vehicle 100 and may be used by computing devices 110 to provide information to passengers within the vehicle 100. The computing devices 110 may also include and/or receive feedback from various status sensors 156 of the vehicle which may include, for instance, a door sensor that may indicate to the computing devices 110 the status (i.e. whether open or closed) of a vehicle door (such as vehicle doors 350, 352 of FIG. 3). Other sensors, such as seat belt sensors, seat sensors (e.g. pressure sensors or switches), internal cameras, etc. may also be part of and/or provide feedback to the computing devices 110 about the status of the vehicle 100.

Computing devices 110 may also include one or more wireless network connections 158 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Figure 2:
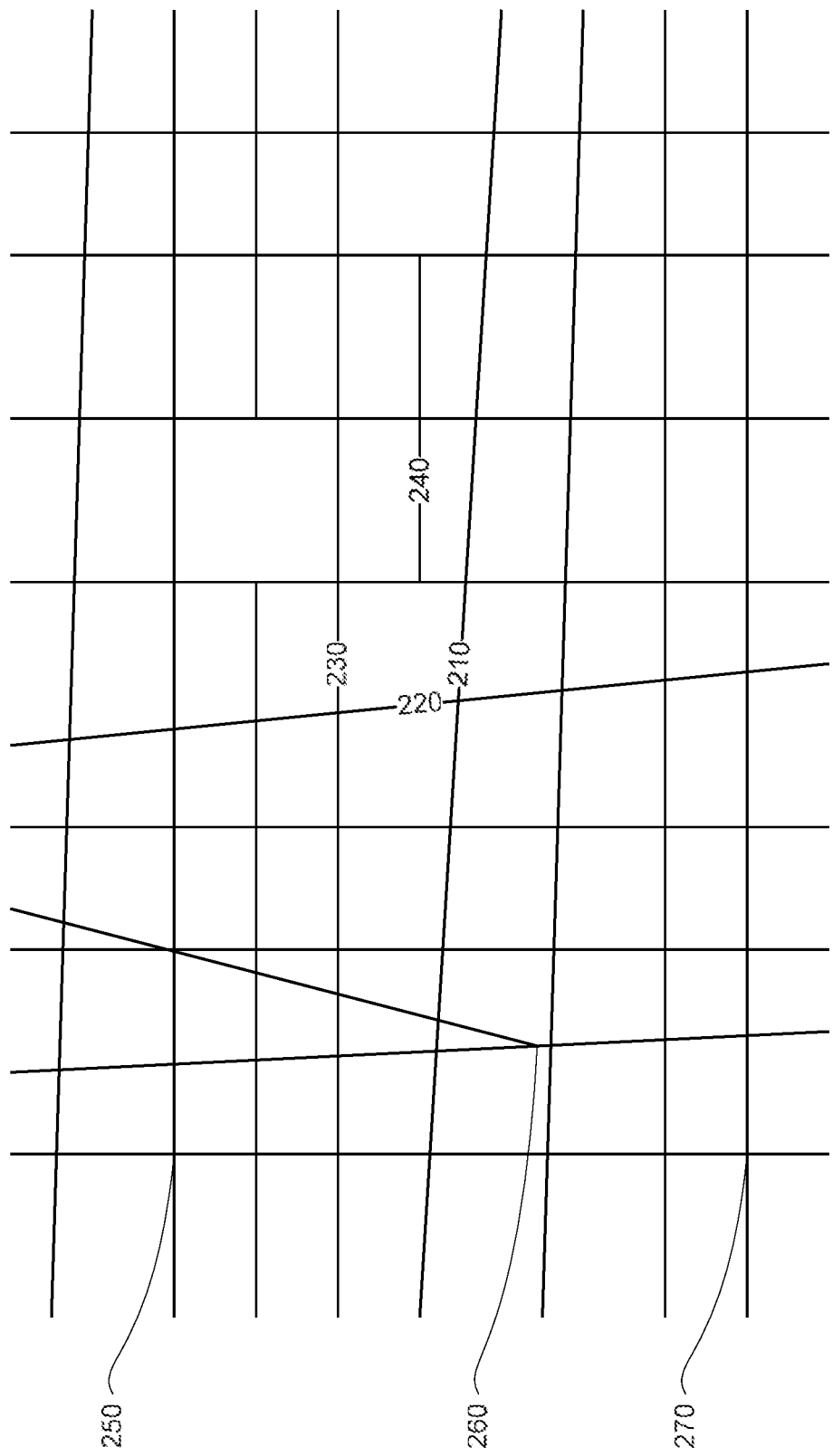
FIG. 2 is an example of map information in accordance with aspects of the disclosure.

Planning system 168 may be used by computing devices 110 in order to determine and follow a route generated by a routing system 170 to a location. For instance, the routing system 170 may use map information to determine a route from a current location of the vehicle to a drop off location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. FIG. 2 is a high-level example of map information 200 for an example city or other geographical area for the purposes of demonstration. In this example, the lines represent roads, such as roads 210, 220, 230, 240, which intersect with one another at various traffic intersections 250, 260, 270. Each of these roads and intersections may be associated with geolocation information (e.g. GPS coordinates) as well as other labels and information as noted above though not depicted for the purposes of simplicity and ease of understanding.

The map information may be stored in various ways. For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
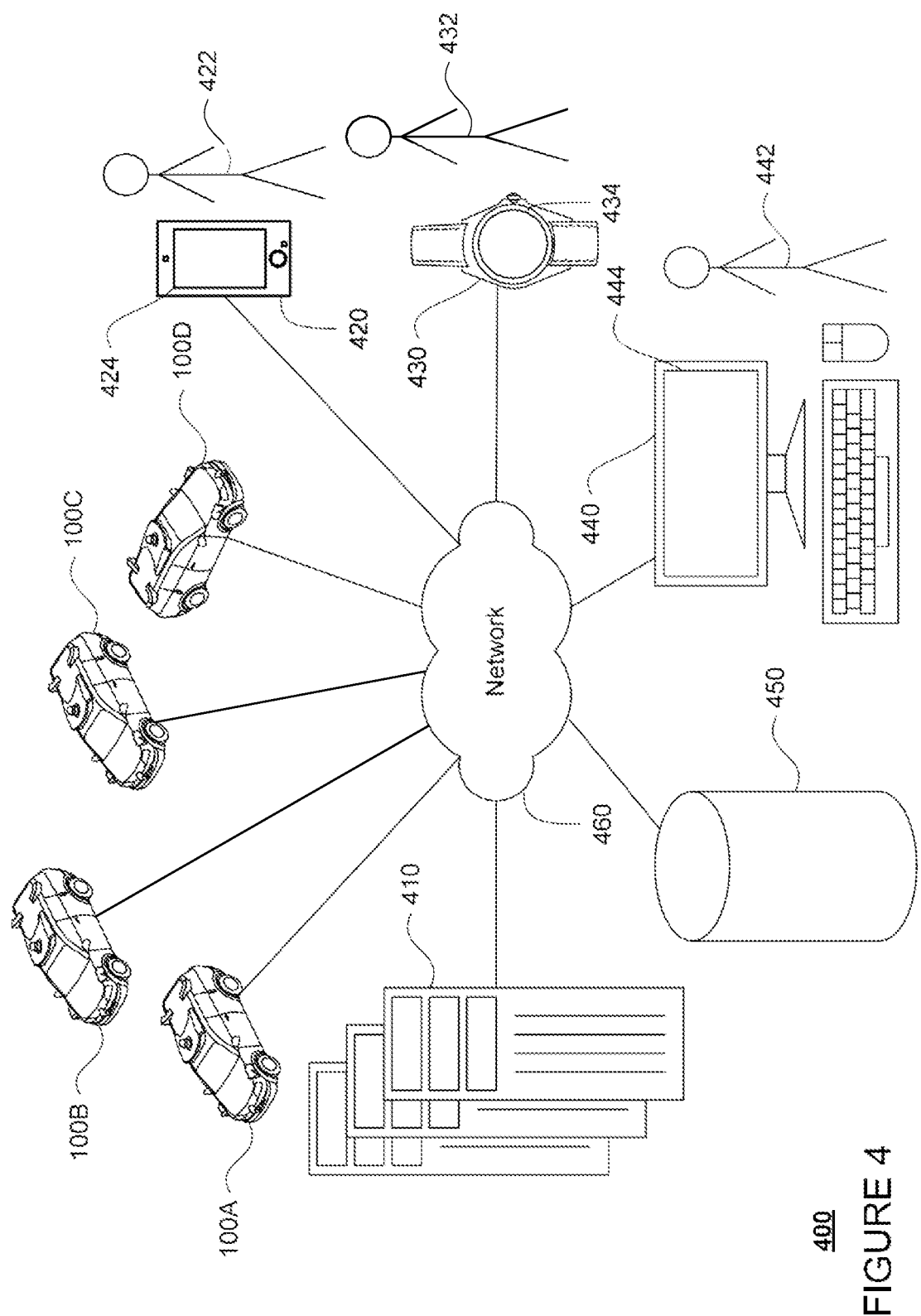
FIG. 4 is a pictorial diagram of an example system in accordance with aspects of the disclosure.
Figure 5:
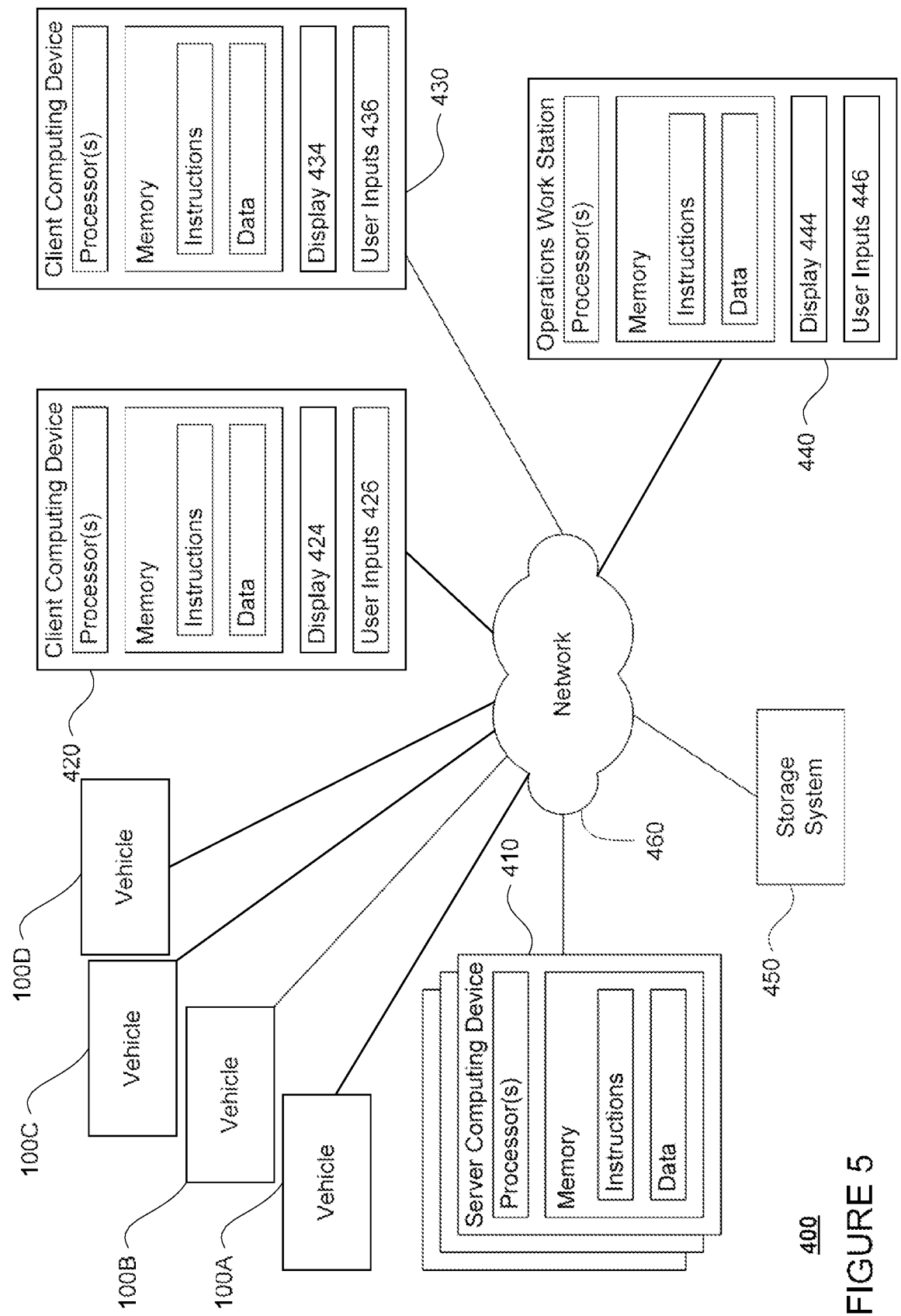
FIG. 5 is a functional diagram of the system of FIG. 3 in accordance with aspects of the disclosure.
Figure 6A:
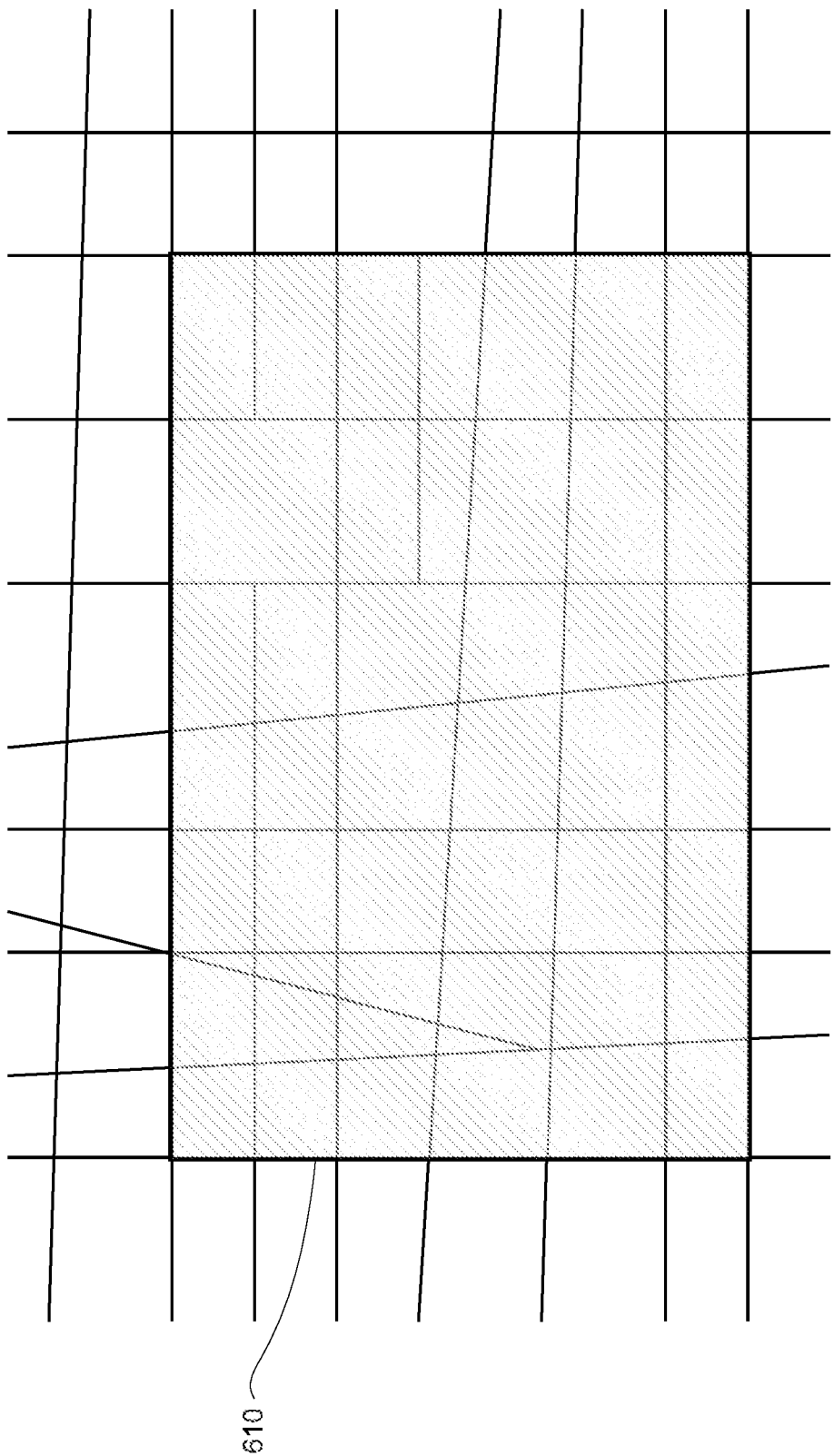

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 300 that includes a plurality of computing devices 410, 420, 430, 440 and a storage system 450 connected via a network 460. System 300 also includes vehicle 100A-D, which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system (dispatching system) which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Figure 3:
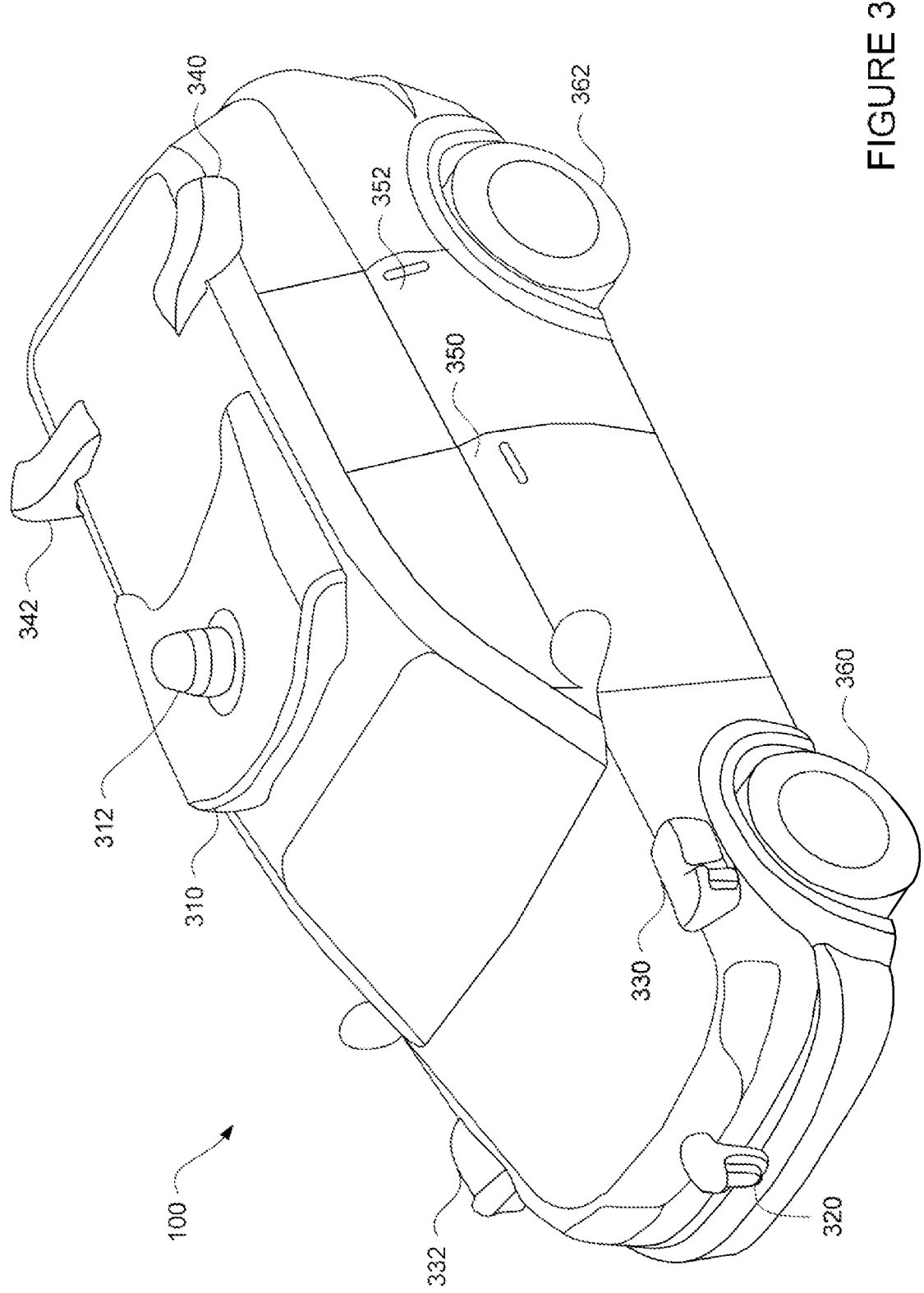
FIG. 3 is an example external view of a vehicle in accordance with aspects of the disclosure.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example, the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

As noted above, the server computing devices 410 may track and access information about vehicles of the fleet. In order to do so, storage system 450 may store information about each vehicle of the fleet such as the last received location, software version of the autonomous driving platform (which may affect whether the vehicle is able to follow certain routes, complete certain maneuvers, etc.), parameters related to the vehicle's ability to traverse the roads in the map, current destination, current route, maintenance information (if required, when needed, if assigned to go to a maintenance location, etc.), number of miles driven, whether the vehicle is currently servicing a trip, the number of passengers, whether the vehicle is available for a trip or when it may become available, a set of possible pick up and drop off locations for the vehicle, etc. In order to do so, the server computing devices 410 may track the status of each vehicle based on status updates received from the vehicles of the fleet and/or information sent to the vehicles of the fleet by the server computing devices 410.

In addition, the storage system 450 may store information identifying a service area for each vehicle of the fleet. Each service area may correspond to a geolocated polygon or multiple polygons that can be used to identify a section of map and the information in the map contained within. For example, FIGS. 6A-6D represent geolocated polygons 610, 620, 630, 640 and 650 associated each of vehicles 100A, 100B, 100C, and 100-D, respectively. Each geolocated polygon represents a service area for its respective vehicle and is depicted with respect to the map information 200 in FIGS. 6A-6D in order to demonstrate the geolocated nature of the polygons. In this regard, the polygons need not actually include the map information depicted as within the polygons, but rather may simply define a geographic area. For instance, each vertex of a polygon may be associated with a geographic location such that a geolocated polygon or service area for a vehicle may be stored as a set of those geographic locations. As shown, the geolocated polygons each represent different service areas though it may also be possible for two or more vehicles of the fleet of vehicles to be associated with the same service areas or rather, the same geolocated polygons.

The polygons may also be updated over time as the service area for one or more of the vehicles of the fleet changes. For example, at one point in time, a service area for one vehicle, such as vehicle 100A, might exclude freeways. But, at a later point in time, vehicle 100A may receive a software update to a new software version which expands the capability of the vehicle 100A to safely drive on freeways. Thus, between the later point in time and the earlier point in time, the service area and polygon for vehicle 100A could be changed. Of course, a service area may not only be a function of the capabilities of a vehicle's software and hardware combinations, various business or other operational considerations may affect where a vehicle is permitted to drive and thus can be the basis of a change or update to a vehicle's service area. For example, if a new service area for vehicles of the fleet becomes available or opens, this may also affect, for instance expand, the service area of some vehicles.

In the example of a vehicle being associated with multiple discontinuous geolocated polygons, as shown in the example of FIG. 6D, a vehicle may be associated with a plurality of discontinuous service areas which do not overlap with one another. As such, vehicle 100D is associated with both geolocated polygon 640 and geolocated polygon 650 which do not overlap with one another. The vehicle 100D may be able to provide trip services within any of the geographical areas corresponding to each of geolocated polygons 640 and 650, but may not be able to provide trip services between the geographical areas of geolocated polygons 640 and 650 (even though the vehicle is able to drive between different ones of the plurality of polygons). For example, a vehicle may be able to drive in two distinct and disconnected service areas, each representing a nearby city connected by a toll bridge. In such cases, the vehicle may be able to pass through toll empty, but the polygons may remain disconnected from one another because the service may be unable to handle the vehicle passing through the toll both with passengers (for instance, because the service is unable to handle payments and corresponding charges to passengers).

The storage system 450 may also store a version of the map information 200 described above as well as various information including data for drawing an image-based map for display or presentation to a user. This data may include the shape and location of roads, points of interest, predetermined pick up and drop off locations, and any other details that may be useful for drawing a map for display.

The storage system 450 may also store user account information. This information may be used, for instance, to authenticate and/or identify the user and/or the user's client computing device in order to facilitate trip services. Some of the account information may identify certain limitations or restrictions on specific users. For example, some users may be restricted to certain areas and/or pick up and drop off locations (e.g. to and from school or work, within a retirement community, to specific locations when offered as part of a discount for trips to those locations, etc.). In other instances, certain types of users may have access to additional or different to service areas. For example, employees of the service may have access to testing areas or users enrolled in early access programs may have access to new pick up locations, drop off locations, and/or service areas ahead of general availability.

The storage system 450 may also identify certain limitations or restrictions on specific types of cargo. For instance, some goods may be restricted or banned in certain municipality, or goods originating from one location may be subject to additional import restrictions when crossing territories (for example, when traveling in interstate commerce). Similarly, hazardous or oversized goods may have restrictions regarding tunnels and bridges or speed limits, which limit their effective service area. As another example, goods from a commissary, country club, etc. may have a small service area. In other instances, certain types of goods may enable increases to service areas. For example, when vehicles are not carrying passengers, it may be permissible for a vehicle carrying specific types of cargo to drive to specific drop off points on restricted routes outside of the polygon for that vehicle in order to make a delivery of goods.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
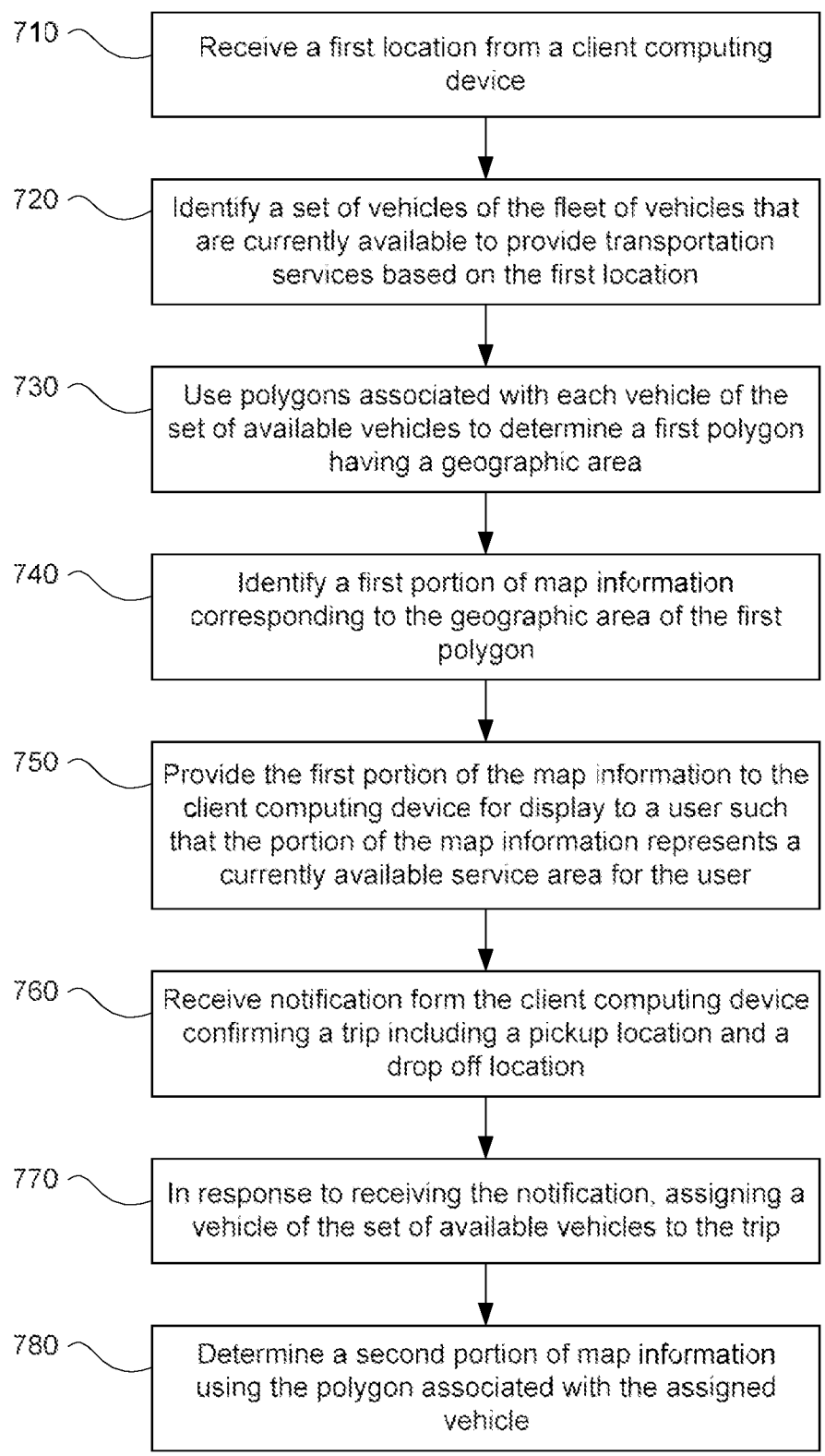
FIG. 7 is an example flow diagram in accordance with aspects of the disclosure.

FIG. 7 is an example flow diagram 700 of aspects of the technology described herein for providing service area maps for an autonomous vehicle transportation service having a fleet of vehicles, which may be performed by one or more processors of one or more computing devices of the vehicle, such as the processors of server computing devices 410. In this example, each vehicle of the fleet is associated with a polygon corresponding to a service area for that vehicle. At block 710, a first location is received from a client computing device.

In order for the server computing devices to receive that first location, a user may first download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 420 to send a request to one or more server computing devices 110 for a vehicle. The application of the client computing device 420 may enable the user to request a trip and provide information such as pick up and drop off location information to the dispatch system. In addition, the application may provide the dispatch system with a location of the client computing device (e.g. GPS or other location information) as well as information about how the application is being used. For instance, the application may send via network 460, and the server computing devices 410 of the dispatch system may receive, notifications when the user opens the application or when the user identifies a pickup and/or drop off location. In this regard, a notification may include a location (e.g. location information identifying the current location of the user's client computing device or a pickup location for a trip to be taken by the user) as well as information identifying the user (or the user's account) such as a user identifier. In some instances, the notification may also include a drop off location. For example, turning to FIG. 8, location point 810 represents a location that may correspond to a pickup location and/or a current location of client computing device 420. In this example, location point 820 may represent a drop off location or alternatively, as noted above, some notifications may also include a drop off location.

Once the server computing devices 410 receive the notification, the server computing devices may identify a set of available vehicles. Returning to FIG. 7, at block 720, a set of vehicles of the fleet of vehicles that are currently available to provide transportation services is identified based on the first location. For instance, the server computing devices 410 may access the information stored in the storage system 450 to identify vehicles which are able to reach any locations identified in the notification (e.g. the pickup location or the current location of the client computing device and the drop off location, if available), and are currently or are expected to be available for trips. Some vehicles may be unavailable due to maintenance requirements, breaks for test drivers, vehicles that are in need or are in the process of being calibrated, etc. In this regard, as noted above, the server computing devices 410 may track the status of each vehicle in the storage system 450 based on status updates received from the vehicles of the fleet and/or information sent to the vehicles of the fleet by the server computing devices.

For example, the server computing devices 410 may identify which vehicles are able to reach the location of location point 810, and if provided in the notification, the location of location point 820. Assuming that each of vehicles 100A-D are available to service trips, the server computing devices 410 may determine whether the service areas of each of the vehicles 100A-100D include the location of location point 810. In this example, all of vehicles 100A-100D may be able to service trips (i.e. pick up passengers) at the location of location point 810 and thus, each of these vehicles may be included in the set of available vehicles. However, if the drop off location is known, the server computing devices 410 may also consider whether vehicles are able to reach the drop off location. Here, neither of the service areas (represented by geolocated polygons 640 and 650) of vehicle 100D include the location of location point 820, thus, vehicle 100D would not be available and would not be included in the set of available vehicles. In this regard, the set of available vehicles may include vehicles 100A, 100B and 100B.

The server computing devices 410 may then identify a map area polygon based on the set of available vehicles. In order to do so, the server computing devices 410 may identify the polygons for each vehicle of the set of available vehicles. Returning to FIG. 7, at block 730, polygons associated with each of the set of available vehicles are used to determine a first polygon having a geographic area. As noted above, each vehicle of the fleet is associated with a polygon corresponding to a service area for that vehicle. For instance, the server computing devices 410 may access the storage system 450 in order to identify the polygons associated with each of the set of available vehicles. For instance, turning to FIG. 9A, and the example where the set of available vehicles may include vehicles 100A, 100B and 100B, the geolocated polygons for vehicles 100A, 100B, and 100C are depicted on the map information 200. In one example, depicted in FIG. 9B, the server computing devices may determine the map polygon to be the largest possible polygon by identifying the largest area covered by any one of the polygons represented by map polygon 910. Alternatively, in the example depicted in FIG. 9C, the server computing devices may determine the map polygon by identifying an area for which all of the polygons overlap represented by map polygon 920. In this regard, map polygon 920 represents an overlapping area where each of the geolocated polygons of vehicles 100A, 100B, and 100C overlap with one another.

In some instances, the resulting map polygon can be reduced (or in some cases, increased) to the area of an intersection with a polygon corresponding to a service area of the user or cargo. For instance, as noted above, some goods and users may be restricted to certain areas or may even be given broader access to locations outside of the resulting map polygon. In such cases, the map polygon, such as map polygon 910 or 920, may be reduced (or in some cases, enlarged) to the area that overlaps with the polygon of the service area of the user or cargo.

Figure 10A:
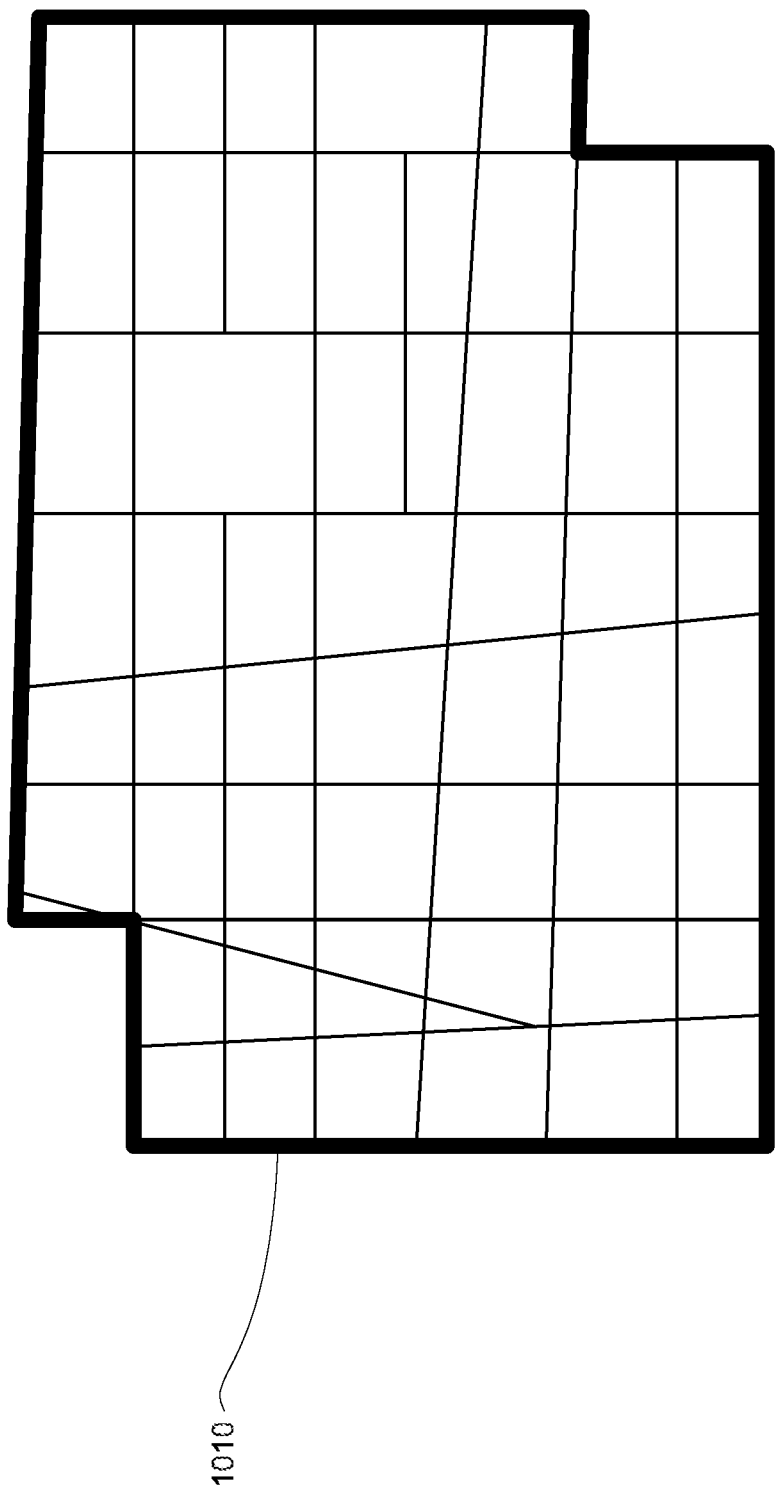
FIGS. 10A-10B are examples of portions of map information in accordance with aspects of the disclosure.
Figure 10B:
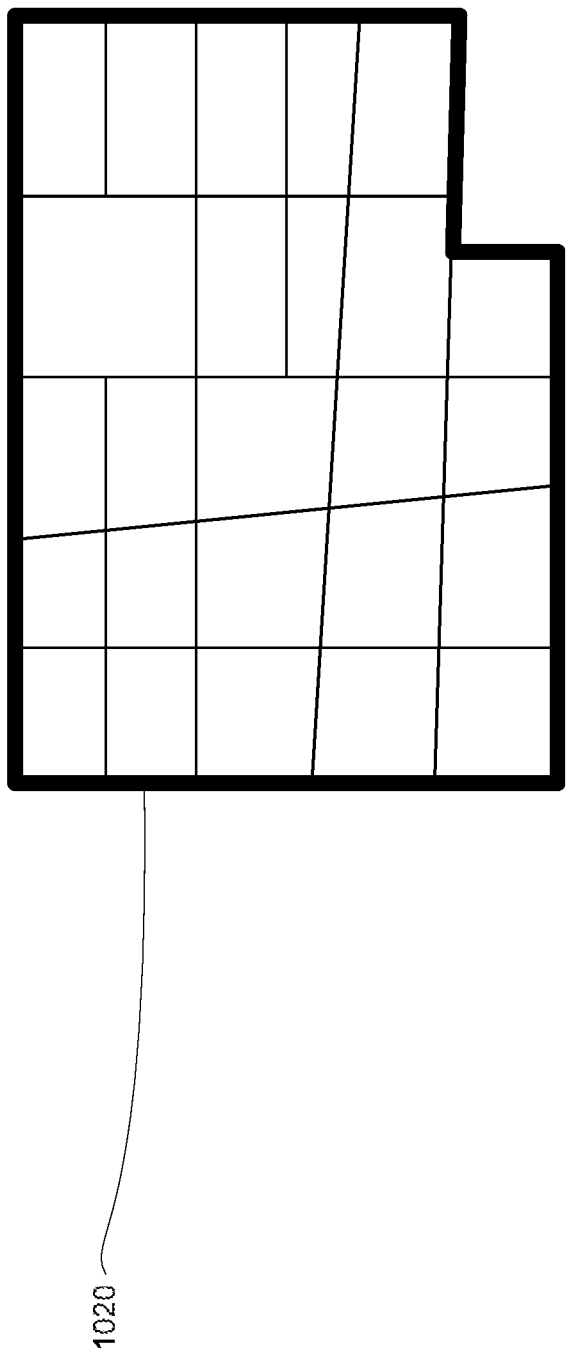

The map polygon may then be used to identify a first portion of the map information. Returning to FIG. 7, at block 740, a portion of map information corresponding to the geographic area of the first polygon is identified. For instance, the geographic area of the map polygon may be used to identify a first portion of the map information corresponding to locations within the geographic area of the map polygon. FIGS. 10A and 10B represent portions of the map information 1010 and 1020 corresponding to the locations with the geographic area of the map polygons 910 and 920, respectively.

The first portion of the map information may then be sent to the user's client computing device for display to the user. Returning to FIG. 7, at block 750, the first portion of the map information is provided to the client computing device for display to a user such that the first portion of the map information represents a currently available service area for the user. For instance, the first portion of the map information 1010 or 1020 may be sent by the server computing devices 410 to the client computing device over network 460. Once received, the first portion of the map information 1010 or 1020 may be displayed to the user 432 on display 424 of client computing devices 420.

Once the user actually confirms a request for a trip, for instance, by confirming the pickup and drop off locations, the application may send another notification to the server computing devices 410. For instance, returning to FIG. 8, location point 820 may represent a drop off location. Returning to FIG. 7, at block 760, receiving a notification from the client computing device confirming a trip including a pickup location and a drop off location. For instance, a confirmation notification may be sent by the client computing devices to the server computing devices 410 over network 460.

Figure 8:
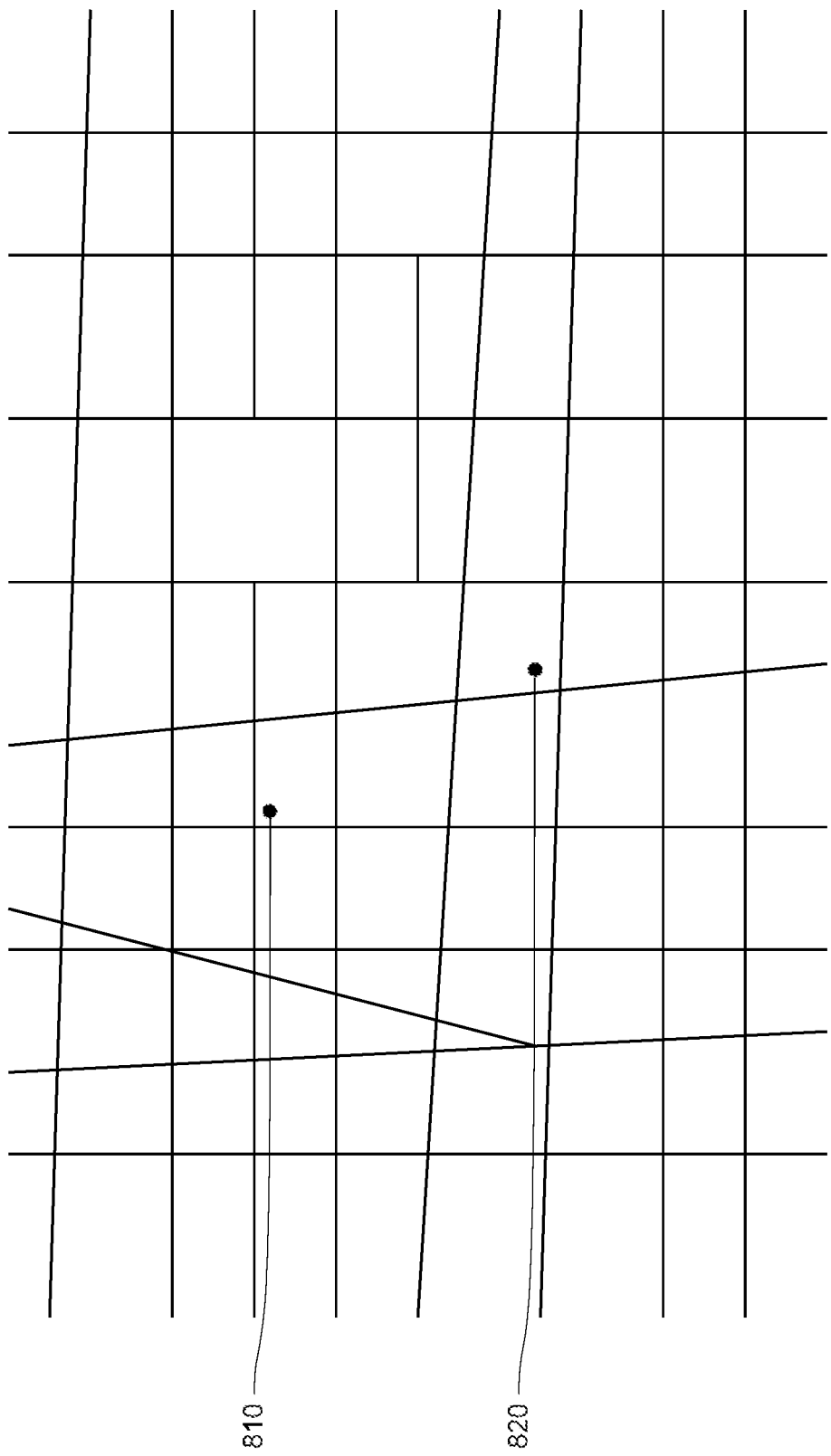
FIG. 8 is an example of map information and data in accordance with aspects of the disclosure.

In response, the server computing devices 410 may assign a vehicle to the user for the trip. At block 770, in response to receiving the notification, a vehicle of the set of available vehicles to the trip is assigned. This may be achieved, for instance, by selecting one of the set of available vehicles based on estimated time of arrival (ETA) of each of the vehicles reaching the pickup location or any number of other fleet planning factors, including, for instance whether it is advantageous to use a particular vehicle or software version or route, whether a vehicle has sufficient fuel, etc. For example, if the service requires driving using a particular software version and vehicles with that particular software version may be selected, even if the ETA is longer. In the example of FIG. 8, the server computing devices 410 may assign vehicle 100A to the user 432 and/or the user's trip between the locations of location point 810 and location point 820 of FIG. 8.

Figure 11:
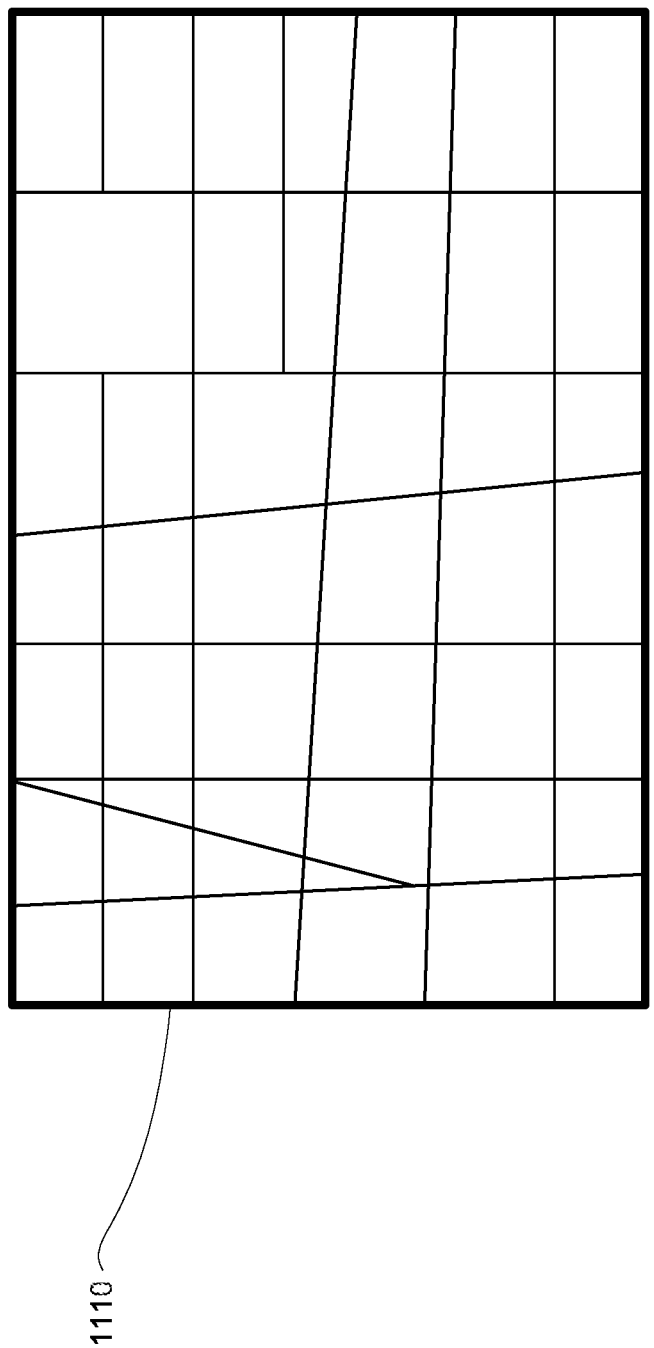
FIG. 11 is an example of a portion of map information in accordance with aspects of the disclosure.

Once the server computing devices 410 have assigned a vehicle, a new portion of map information may be determined using the polygon of the assigned vehicle. This new portion of map information may represent a service area for the trip. At block 780, a new portion of map information is determined using the polygon associated with the assigned vehicle. For instance, the geographic area of the polygon of the assigned vehicle may be used to identify the new portion of map information. Turning to the example of FIG. 11, where vehicle 100A is assigned, new map information 1110 may correspond to the geographic area of geolocated polygon 610 and may represent a service area for the trip that the user 432 is taking between the locations of location point 810 and location point 820. In some instances, where there is a limited service area for the user, the new portion of map information may be determined to be the intersection of the polygon of the assigned vehicle and the polygon of the user. Again, the geographic area of this intersection may be used to identify the new portion of map information.

This second portion of map information may be sent to the assigned vehicle and/or the user's client computing device for display to the user. In this regard, the second portion of map information 1110 may be sent to the client computing device 420 and/or computing devices 110 and displayed on a display of the vehicle, such as display 152, and/or the user's client computing device, such as display 424.

Comparing portion of map information 1110 and portion of map information 1010 or 1020, it is apparent that the service areas that are available to a user before a trip and during a trip may be different. Thus, it is important that the user is provided with the most relevant portion of map information which provides the user with an understanding of service areas available to a user at any given time. As such, the features provided herein allow for real-time determination of available service areas and map information for users of autonomous vehicle services. In this regard, when user 432 is on a trip, the user will be readily able to understand the service area that the assigned vehicle is capable of taking the user during the trip and the user may be prevented from attempting to go outside of the service area for the trip and that the assigned vehicle is permitted to or can actually reach. In other words, the user is unlikely to mistakenly think that the vehicle is able to take him or her beyond the service area of the assigned vehicle, even if such areas were previously available when the user was requesting and confirming the trip.

In addition to being associated with a service area, each vehicle may also be associated with different sets of pick up and drop off locations. This information may also be stored in the storage system 450. For instance, certain vehicles may be able to drive in certain areas, but may not be able to stop to pick up or drop off passengers in those areas. For example, a certain vehicle may not be capable of parallel parking or parking in areas where the vehicle would have to back up (i.e. reverse itself). As such, these pickup and drop off locations can also be considered when processing polygons to identify the map polygons. For instance, once the map polygon is identified, a set of pick up and drop off locations may be identified by identifying all of the pickup and drop off locations within the map polygon that any one of the set of available vehicles is able to reach (i.e. a superset). In addition, this set can be narrowed or filtered based on any limitations on pick up and drop off locations for the user and/or cargo. The set of pick up and drop off locations may also be provided to the user's client computing device for display to the user. For instance, these locations may be depicted as available pick up and/or drop off locations within the portion of map information.

Similarly, once a vehicle is assigned, available drop off locations for the assigned vehicle may also be provided by the server computing devices 410 to the vehicle and/or the user's client computing device for display to the user. As in the examples above, these drop off locations may also be filtered based on any limitations for the user and/or cargo. In this regard, the user will be aware of exactly which drop off locations are available to the user should the user want to change the destination during the trip. For example, these locations may be depicted as available drop off locations within the new portion of map information.

The features described herein may enable an autonomous vehicle service to provide trips using a fleet of vehicles which may have different service areas to users which themselves may have service area restrictions. In addition, the features described herein enable users to readily understand the available service areas (and in some instances, specific pick up and drop off locations) that are available at any given time. Moreover, when a user is on a trip, the user may be prevented from trying to go outside of the service area that the assigned vehicle is permitted to or can actually reach.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of providing service area maps for an autonomous vehicle transportation service having a fleet of vehicles, the method comprising the steps of:
   receiving, by one or more server computing devices, a first location from a client computing device;
   identifying, by the one or more server computing devices, a set of vehicles of the fleet of vehicles that are currently available to provide transportation services based on the first location;
   accessing for each given vehicle of the currently available vehicles at least one vehicle-specific polygon corresponding to a service area defined, in part, by the capabilities of the given vehicle;
   using, by the one or more server computing devices, the polygons associated with each of the set of vehicles to determine a first polygon having a geographic area;
   identifying, by the one or more server computing devices, a first portion of map information corresponding to the geographic area of the first polygon;
   providing, by the one or more server computing devices, the first portion of the map information to the client computing device for display to a user such that the first portion of the map information represents a currently available service area for the user; and
   dispatching to the user, by one or more server computer devices, a vehicle within the set of vehicles, based, at least in part, upon the first polygon.

2. The method of claim 1, wherein the first location is a pickup location for a trip to be taken by the user.

3. The method of claim 2, wherein the first location is a current location of the client computing device.

4. The method of claim 1, further comprising receiving a notification that an application of the client computing device for the autonomous vehicle transportation service has been opened, and wherein the identifying the set of available vehicles is in response to the notification.

5. The method of claim 1, wherein identifying the set of vehicles includes identifying vehicles that are able to reach the first location in order to pick up the user.

6. The method of claim 1, wherein determining the first polygon includes determining a largest area covered by all of the polygons associated with each of the set of vehicles.

7. The method of claim 1, wherein determining the first polygon includes determining an overlapping area where all of the polygons associated with each of the set of vehicles overlap with one another.

8. The method of claim 1, further comprising, reducing the first polygon using a polygon corresponding to a service area for the user, and wherein the reduced first polygon is used to identify the portion of map information.

9. The method of claim 8, wherein the reduced first polygon corresponds to an area of intersection between the first polygon and the polygon corresponding to a service area for the user.

10. The method of claim 1, wherein each vehicle of the fleet is associated with a set of pick up and/or drop off locations, and the method further comprises:
   determining a first set of pick up and/or drop off locations based on the sets of pick up and/or drop off locations for the vehicles of the set of available vehicles; and
   providing the first set of pick up and/or drop off locations to the client computing device.

11. The method of claim 10, wherein determining the first set of pick up and/or drop off locations is further based on the geographic area of the first polygon.

12. The method of claim 10, further comprising, prior to providing the first set of pick up and/or drop off locations to the client computing device, filtering the first set of pick up and/or drop off locations based on any limitations on pick up and drop off locations for the user.

13. The method of claim 1, further comprising:
   receiving a notification from the client computing device confirming a trip including a pickup location and a drop off location;
   in response to receiving the notification, assigning a vehicle of the set of available vehicles to the trip; and
   determining a second portion of map information using the at least one polygon of the assigned vehicle.

14. The method of claim 13, wherein determining the second portion of map information is further based on a polygon corresponding to a service area for the user.

15. The method of claim 14, further comprising determining an intersection between the at least one polygon of the assigned vehicle and the polygon corresponding to a service area for the user, and wherein determining the second portion of map information is further based on the intersection.

16. The method of claim 13, further comprising, sending the second portion of map information to the assigned vehicle for display to the user in order to prevent the user from attempting to go outside of the service area for the trip during the trip.

17. The method of claim 13, further comprising, sending the second portion of map information to the client computing device for display to the user in order to prevent the user from attempting to go outside of the service area for the trip during the trip.

18. The method of claim 13, wherein each vehicle of the fleet is associated with a set of drop off locations, and the method further comprises:
   determining a first set of drop off locations based on the set of drop off locations for the assigned vehicle; and
   providing the first set of drop off locations to at least one of the assigned vehicle or the client computing device.

19. The method of claim 18, further comprising determining an intersection between the at least one polygon of the assigned vehicle and a polygon corresponding to a service area for the user, and wherein determining the first set of drop off location is further based on the intersection.

20. The method of claim 19, further comprising, prior to providing the first set of drop off locations to at least one of the assigned vehicles or the client computing device, filtering the first set of drop off locations based on any limitations on drop off locations for the user.

* * * * *